T. A. SCOTT.
GREEN PEA VINE HULLING MACHINE.
APPLICATION FILED JAN. 10, 1910.
957,444.
Patented May 10, 1910.
3 SHEETS—SHEET 1.
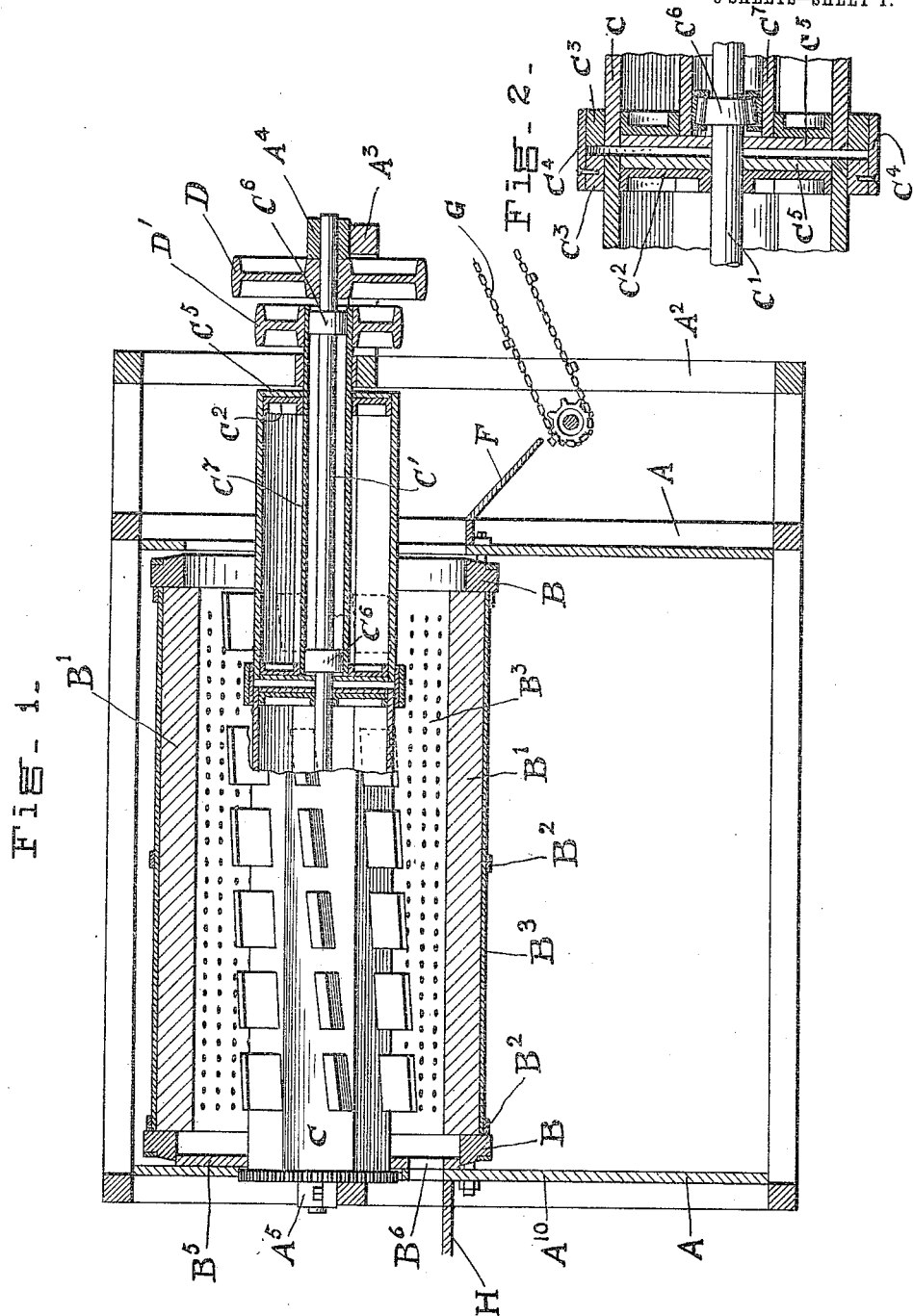

T. A. SCOTT.
GREEN PEA VINE HULLING MACHINE.
APPLICATION FILED JAN. 10, 1910.
957,444.
Patented May 10, 1910.
3 SHEETS—SHEET 2.
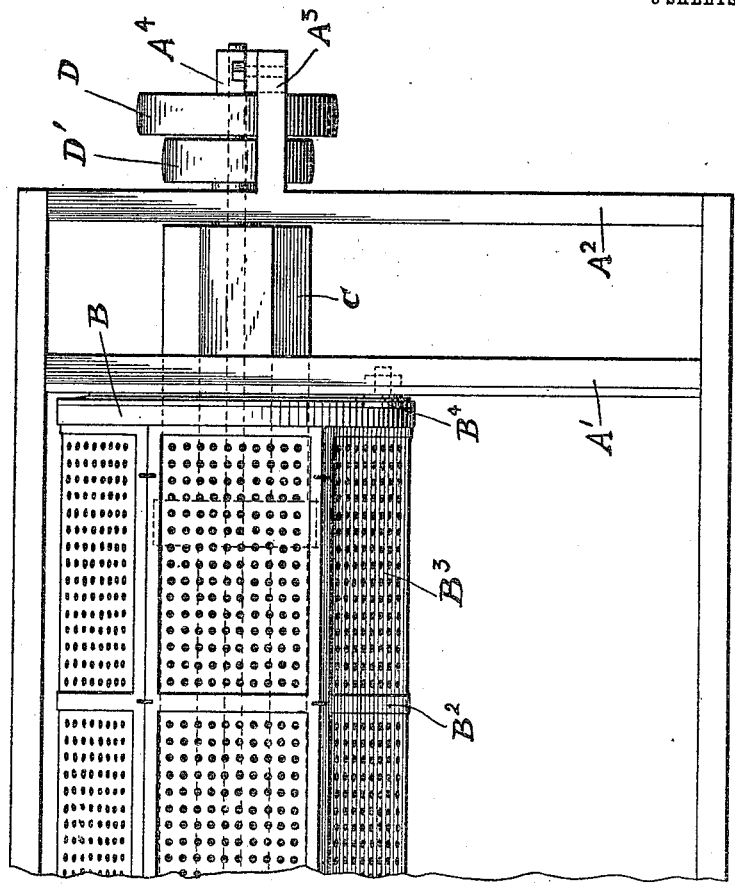
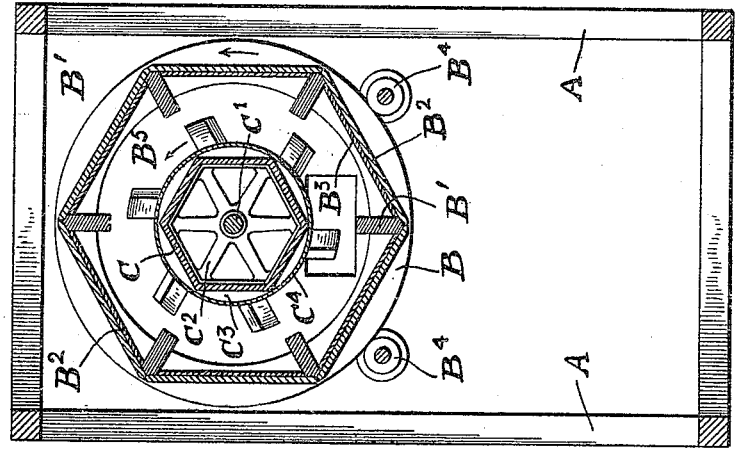
WITNESSES:
INVENTOR
Thomas A. Scott.
ATTORNEYS.

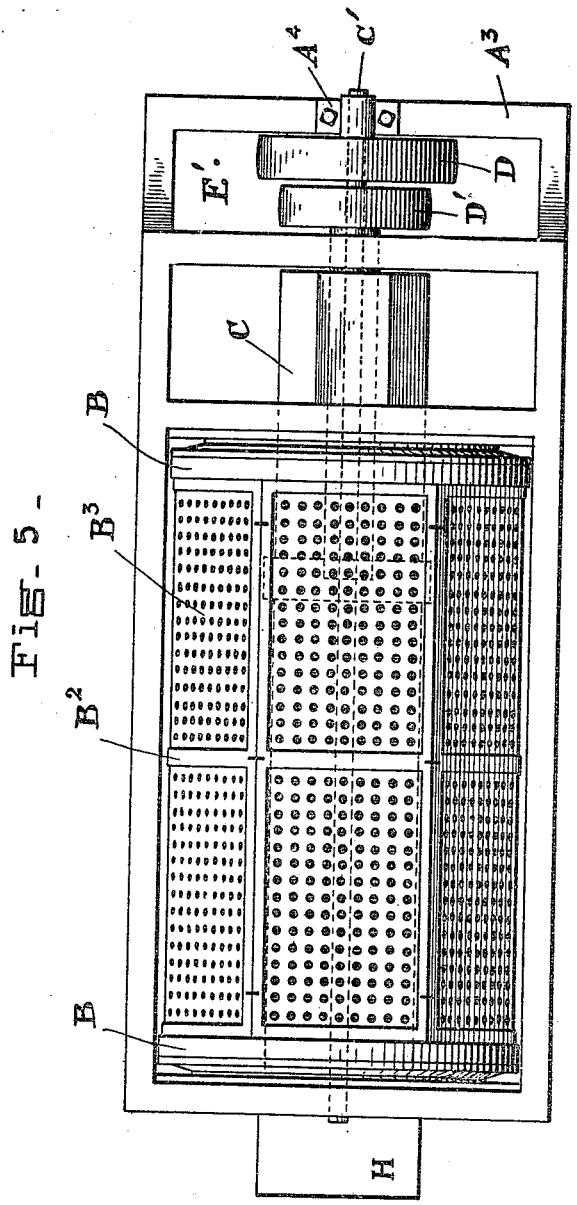

UNITED STATES PATENT OFFICE.

THOMAS A. SCOTT, OF CADIZ, OHIO.

GREEN-PEA-VINE-HULLING MACHINE.

957,444.

Specification of Letters Patent.   Patented May 10, 1910.

Application filed January 10, 1910.   Serial No. 537,377.

*To all whom it may concern:*

Be it known that I, THOMAS A. SCOTT, a citizen of the United States, residing at Cadiz, in the county of Harrison and State of Ohio, have invented a new and useful Improvement in Green - Pea - Vine - Hulling Machines, of which the following is a specification.

My invention relates to an improvement in that class of machines shown in Patent No. 500,299, of June 27, 1893, to Scott, Chisholm and Chisholm, by which green peas are hulled while still attached to the vines. In the operation of this machine, masses of green pea-vines with the pea-pods attached are removed from the fields and are fed to the machine. There is an outer cylinder, provided with elevating ribs, which repeatedly act to raise a given mass of vines and then to let it drop. There is an inner revolving drum carrying slanted beaters which strike the masses of vines and the pea-pods therein while falling, thus hulling the peas. The path of the vines through the machine is a helix around the beater-carrying drum, the same mass of vines being repeatedly struck by the beaters while passing along this helix.

It is necessary, on the one hand, to have the beater velocity high enough so that their impact will crack open all the pea-pods before these are discharged. On the other hand, this beater velocity may not exceed a certain amount without damaging the tender pea-berries. The shock of the impact is applied not merely to pods on the surface of the masses of vines but is also transmitted through the vines to hull the pods embedded therein. A beater-speed high enough to hull a pod embedded in a mass of vines may damage the berries in a pod which is struck while on the surface of the mass. It happens, as a consequence, that the lowest beater velocity which will hull all the peas in their transit through the machine, which is necessarily of a limited length, and the highest permissible velocity which will not damage any substantial proportion of the berries are quite close together. It results, therefore, that with a machine as constructed in the patent in question, the operator who regulates the beater-speed is in danger either of damaging some pea-berries or of letting some pods pass through the machine unhulled.

I have discovered that the pods which resist hulling with the usual beater-speeds may be successfully hulled by subjecting them to a higher beater-speed at the exit end of the machine. In this way I do not damage the berries of the normal pods, which are being hulled in their passage through the first part of the machine, but I do hull, and without damaging the berries, those refractory pods which have remained unhulled toward the discharge end.

In the drawings,—Figure 1 is a longitudinal, central, section of my machine; Fig. 2 is a cross-sectional detail of the abutting ends of the feed and discharge end sections of the beater-carrying drum; Fig. 3 is a transverse, vertical cross-section of the outer cylinder, the beater-carrying drum and the supporting frame; Fig. 4 is an elevation of the discharge end of the machine; Fig. 5 is a plan of the entire machine.

I employ a frame composed of the sections A, A' and $A^2$. The outer cylinder is composed of the ring B connected by the elevating ribs B' and covered by perforated rubber $B^3$ secured to frames $B^2$, which are in turn fastened to the elevating ribs and end rings. This outer cylinder, composed of the end rings, the elevating ribs and the perforated covering, is supported on travelers $B^4$, secured respectively to the frames A and A', and is rotated at say 30 turns a minute by any suitable mechanism not necessary here to be shown. At the feed-end, the outer cylinder is closed by a circular face-plate $B^5$ having a feed aperture $B^6$, the face-plate being attached to a supporting frame-plate $A^{10}$. At the discharge end the outer cylinder is quite open so that there may be no obstruction to the discharge of the vines.

There is a longitudinal shaft C', driven by a pulley D, supported in bearings $A^4$, $A^5$, the bearing $A^5$ being supported on the frame A, and the bearing $A^4$ being supported on an extension $A^3$ firmly secured to the frame $A^2$. Upon this shaft C' are mounted two hexagonal spiders $C^2$, to which are secured the six boards or plates C constituting the outer face of the feed-end section of the beater-carrying drum. The ends of the drum are closed by end-plates $C^5$, secured to the spiders $C^2$, whereby all dirt is kept from the inside of the drum.

At the discharge end, there is a similar but independently revolving beater-carrying drum section which also projects beyond the end of the outer cylinder. This drum is supported on a hollow shaft $C^7$, driven by a pulley $D'$, which shaft $C^7$ is mounted and rotates upon the shaft $C'$ by the use of roller-bearings $C^6$. To the hollow shaft $C^7$ are secured two spiders $C^2$, to which spiders are fastened the boards $C$, which constitute the outer face of the discharge-section of the beater-carrying drum. I also use end-plates $C^5$ on these spiders to close this drum-section against access of dirt.

In order to prevent pea-vines or other extraneous material from getting between the beater-carrying drum-sections and thus clogging the machine, I build the hexagonal prisms, which define the shape of the drum, into cylinders near the plane of juxtaposition by adding thereto segments $C^3$ of a circle, as shown in Figs. 2 and 3. I thereupon secure a short cylindrical sleeve or collar $C^4$, to the segments $C^3$ on the feed-end section and let this collar rotate, with a fairly tight fit, upon the segments $C^3$ on the discharge-end section of the beater-carrying drum. In this way the two drum sections may rotate independently and extraneous material is nevertheless kept from getting between their adjacent faces.

It will be noted that I employ the usual feed-board H and an inclined discharge plate F, which receives the vines as they leave the machine and transfers them to a carrier G, which removes the hulled vines to the discharge pile.

I have not thought it necessary to show the oiling devices for the roller-bearings or the inclined separating apron which is used under the outer cylinder and receives the hulled peas and such small pieces of refuse as pass through the perforations in the covering of the outer cylinder. Such separating apron is fully shown in the prior patent above referred to and forms no part of the present invention. I may say, further, that the discharge-end section of the beater-carrying drum comprises a part within the outer cylinder which carries beaters and a part which extends beyond the outer cylinder, which has the function of protecting and guarding the power shafts from the vines which would otherwise wrap around and clog them.

The operation of the machine will now be clear. Masses of pea-vines with the pea-pods attached thereto are fed along the feed-board H, through the feed aperture $B^6$, whence they fall into the bottom of the outer cylinder. The rotation of this cylinder causes the elevating ribs to raise the vines to the upper half, whence they drop off the elevating ribs and fall toward the bottom of the cylinder. While falling, each mass of vines is struck by some rapidly rotating beater on the feed-end section of the beater-carrying drum. As a consequence, each mass of vines is hurled across the top of the beater-carrying drum in a direction having a bias toward the discharge-end of the outer cylinder and comes to rest against the inner surface of the outer cylinder at a point nearer the discharge-end than before. The operation of raising the mass of vines and of batting them, while falling, across the top of the beater-carrying drum toward the discharge-end by the beaters on that drum is repeated until the vines are finally discharged. During this operation, the pea-pods have been again and again struck and the berries therein have been released. The pea-berries pass through the perforations in the covering of the outer cylinder and the vines pass through the open discharge-end of this cylinder.

It will be understood that those impacts which are given to the bunches of vines by the feed-end section of the beater-carrying drum are given at the velocities now common in the art; but that the speed of rotation of the discharge-end section of the beater-carrying drum is such as to impart to the falling masses of vines an impact at a velocity considerably higher than is now customary. As a result the percentage of pods which now reach the straw unhulled is largely decreased and this without appreciably damaging the pea-berries.

I claim,—

1. A green-pea vine-hulling machine comprising an outer cylinder having elevating ribs, a set of revolving beaters near the feed-end, an independently revolving set of beaters near the discharge-end, and power devices for rotating the latter beaters more rapidly than the former, substantially as described.

2. A green-pea vine-hulling machine comprising an outer cylinder having elevating ribs, and an inner beater-carrying drum having a feed-end section and an independently revolving discharge-end section driven at a higher speed, substantially as described.

3. A green-pea vine-hulling machine comprising an outer cylinder having elevating ribs, an inner beater-carrying drum having a feed-end section and an independently revolving discharge-end section, and power devices for revolving the last named section more rapidly than the first, substantially as described.

4. A green-pea vine-hulling machine comprising an outer cylinder having elevating ribs, a central shaft, beaters supported on and driven thereby, a hollow shaft supported on the central shaft, beaters supported on and driven thereby, and devices for rotating the hollow shaft and central shaft at different speeds, substantially as described.

5. A green-pea vine-hulling machine comprising an outer cylinder having elevating ribs, an inner beater-carrying drum having a feed-end section and an independently revolving discharge-end section, said discharge-end section having a portion within the outer cylinder provided with beaters and a portion projecting beyond the outer cylinder to act as a guard, and devices for moving the discharge-end section at a higher speed than the feed-end section, substantially as described.

In testimony whereof I have signed my name to this specification in the presence of two subscribing witnesses.

THOMAS A. SCOTT.

Witnesses:
C. R. SNYDER,
JOHN A. HANNA.